Figure 1:
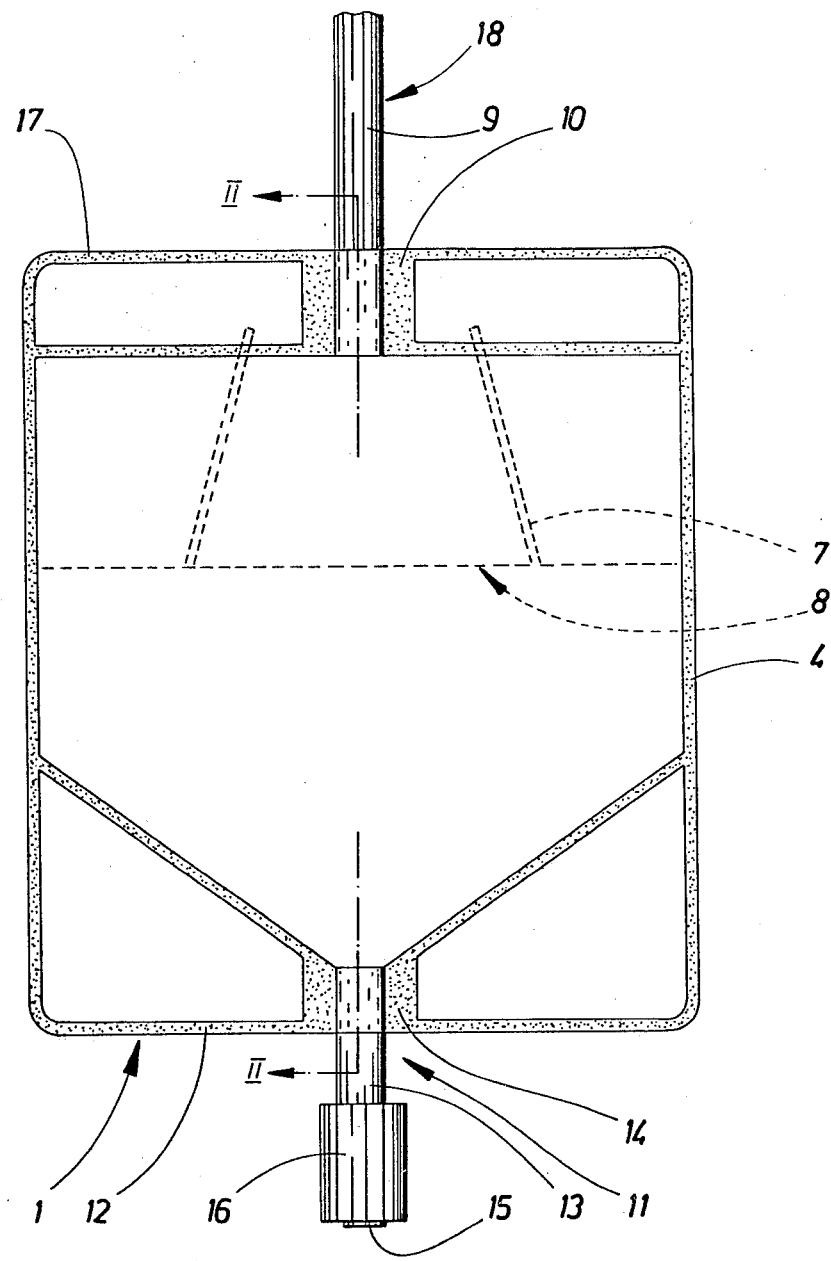

United States Patent [19]

Niklasson

[11] 4,445,960

[45] May 1, 1984

[54] METHOD AND APPARATUS FOR MANUFACTURING OF ARTICLES FROM ONE OR SEVERAL FILM WEBS WELDED TO AND STRIPPED FROM A CONVEYOR BELT

[75] Inventor: Tage Niklasson, Lysekil, Sweden

[73] Assignee: FIAB System AB, Lysekil, Sweden

[21] Appl. No.: 387,858

[22] PCT Filed: Oct. 1, 1981

[86] PCT No.: PCT/SE81/00284
§ 371 Date: May 28, 1982
§ 102(e) Date: May 28, 1982

[87] PCT Pub. No.: WO82/01158
PCT Pub. Date: Apr. 15, 1982

[30] Foreign Application Priority Data
Oct. 2, 1980 [SE] Sweden ................................ 8006893

[51] Int. Cl.³ ............................................ B32B 31/20
[52] U.S. Cl. ................................. 156/344; 156/275.1; 156/289; 156/290; 156/308.4; 156/324; 156/380.2; 156/553; 156/584
[58] Field of Search ..................... 156/306.3, 289, 290, 156/308.4, 344, 324, 275.1, 380.2, 380.6, 543, 553, 584

[56] References Cited

U.S. PATENT DOCUMENTS 4,214,509  7/1980  Van Der Meulen .......... 156/290 X
4,289,559  9/1981  Murphy ......................... 156/344 X Primary Examiner—Robert A. Dawson

[57] ABSTRACT

A method and an apparatus for manufacturing of articles from continuous film webs (2, 3, 5, 6) by means of welding the film during transportation of the film webs through treatment stations (24, 25, 26). The film webs are during their transport supported by a movable conveyor belt (40) and welded against the conveyor belt so that the film webs (2, 3, 5, 6) adhere to and are connected to the belt and conveyed via formed connections (45) and are released from the conveyor belt after accomplished transportation.

10 Claims, 4 Drawing Figures

METHOD AND APPARATUS FOR MANUFACTURING OF ARTICLES FROM ONE OR SEVERAL FILM WEBS WELDED TO AND STRIPPED FROM A CONVEYOR BELT

The present invention relates to a method for the manufacturing of articles from one or several film webs by means of treatment operations, such as welding the film during transportation of the film web or webs through one or several operating stations in an apparatus, said film web or webs being during at least a portion of said transportation supported by at least one movable conveyor belt.

The present invention also relates to an apparatus for the accomplishment of the method for manufacturing of articles from one or several continous film webs including one or several welding stations, through which the film web or webs are transported, said web or webs being during at least a part of said transportation supported by at least one movable conveyor belt.

In connection with the manufacturing of articles from film webs, such as medical infusion containers, urine containers, sheets for photograph albums, folders etc., the film webs are transported through an apparatus usually stepwise while winding off the continuous webs from storage rolls. Irrespective of the fact that the film webs are transported by the application of only a traction force acting directly on the film web or the film web also is supported by a conveyor belt, non-desirable traction forces arise in the film with a risk that they are broken or that an oblique tension arises. Such an oblique tension arises especially in connection with the manufacturing of articles, where certain details are mounted, such as infusion containers, urine containers where tubings, valves and similar parts are mounted. In order to eliminate this oblique tension because of the fact that pieces of tubes are mounted to one edge of the film webs, the apparatus must be provided with a separate device for the transportation of the tube pieces. However, this separate transportation device increases the costs for the apparatus and requires a special space.

The object of the present invention is to eliminate the disadvantages mentioned above connected to the prior known methods and apparatuses.

Said object is obtained by means of a method, which is characterized in that the film web or webs are during at least one welding operation welded against the conveyor belt so that the film web or webs adhere to and are connected to the belt and conveyed via formed connections and after accomplished transportation released from the conveyor belt.

Said object is also obtained by means of anapparatus, which is characterized in that the conveyor belt extends through at least one of the welding stations over a welding dolly, so that the film web or webs are welded against the conveyor belts so that the film web or webs adhere to and are connected to the belt and conveyed via connections to a releasing station, at which the articles are released from the conveyor belt.

Figure 2:
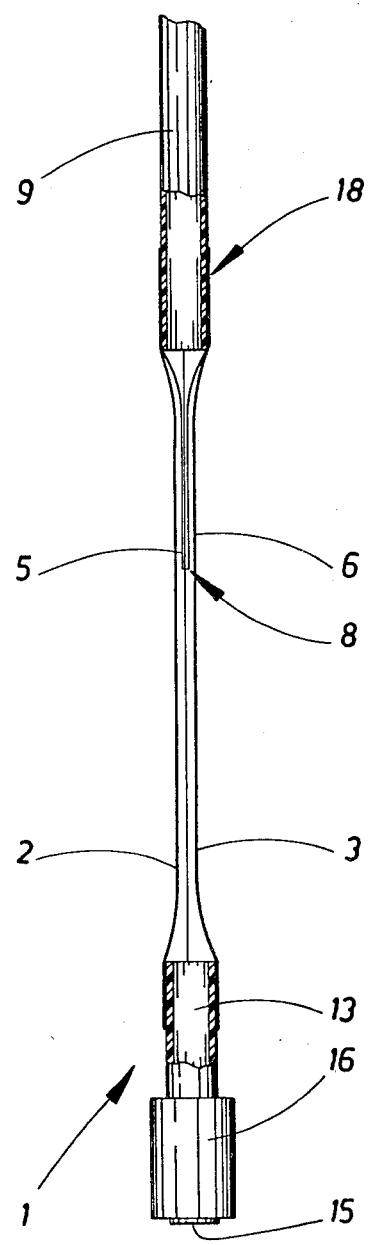
Figure 3:
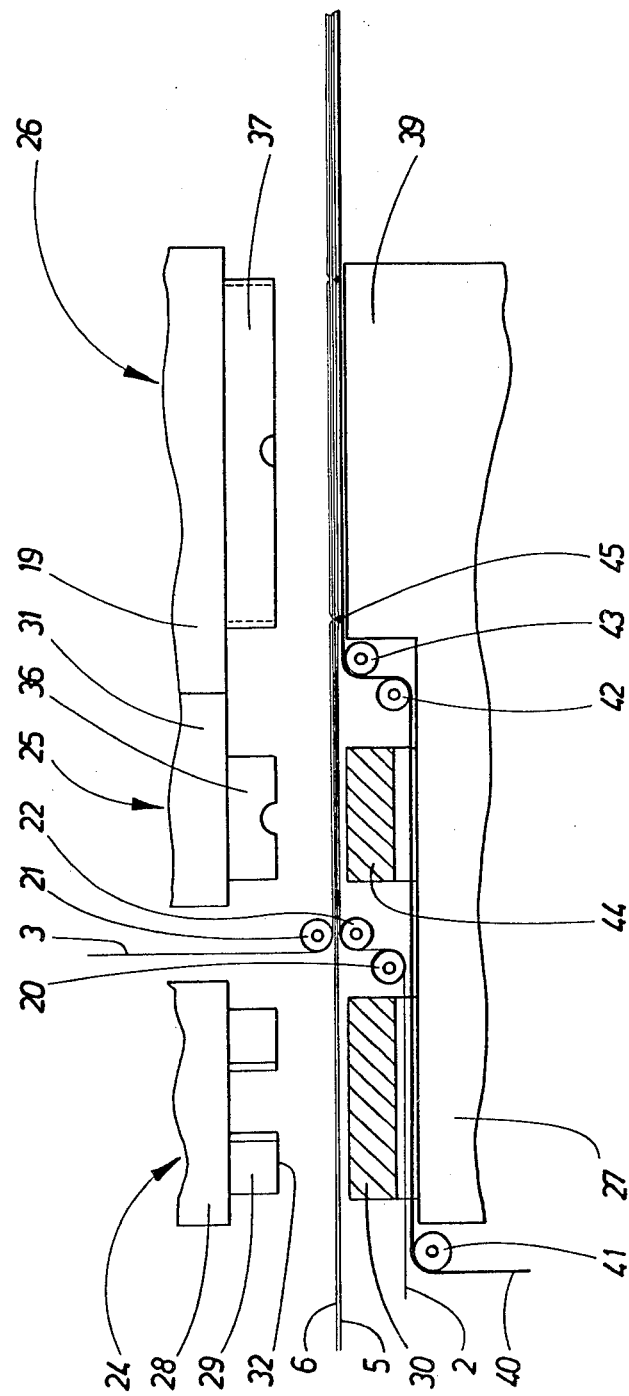
Figure 4:
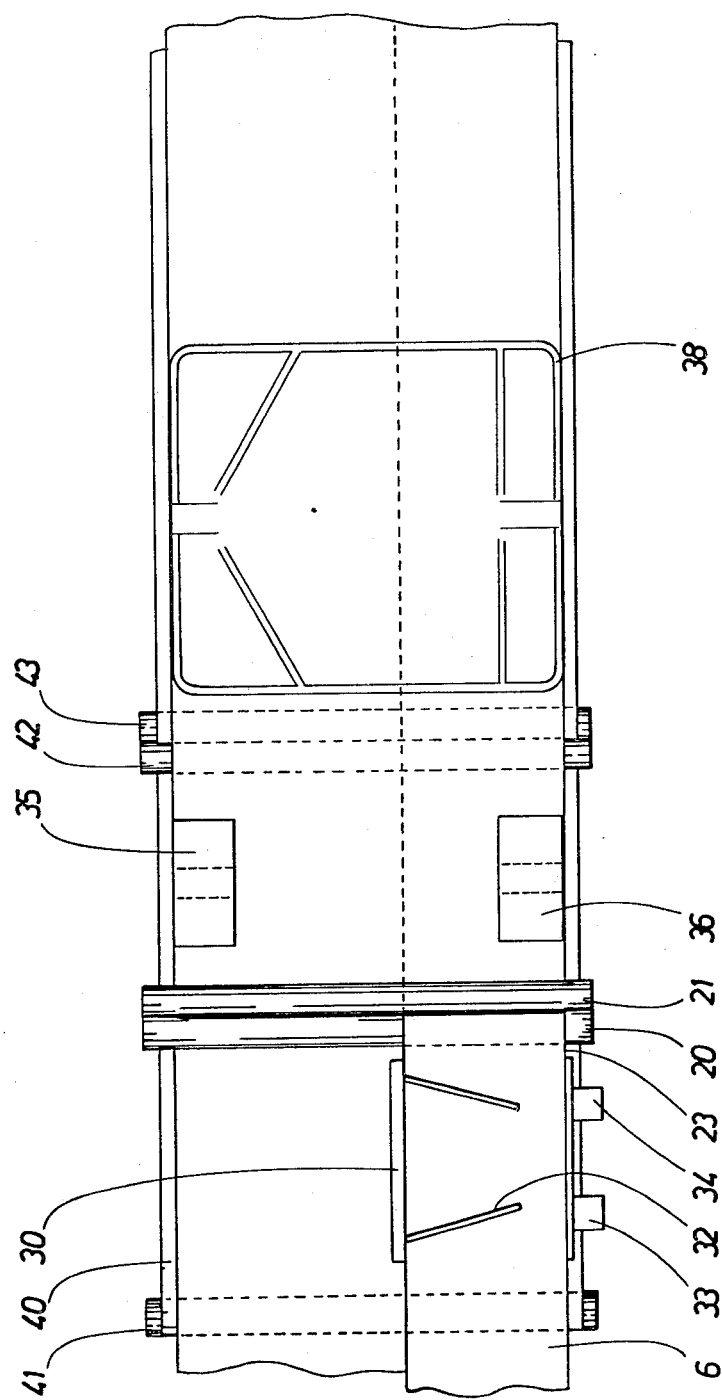

The invention will now be described in the following in an embodiment with reference to the enclosed drawings, on which:

FIG. 1 by means of a plan view shows an example of an article manufactured by means of the method and the apparatus according to the invention, FIG. 2 shows a section through said article along the line II—II in FIG. 1, FIG. 3 shows schematically a side view of a part of an apparatus according to the present invention; and FIG. 4 shows a plan view of the apparatus according to FIG. 3.

In FIGS. 1 and 2 there is shown an example of an article, in connection with which the method and the apparatus for its manufacture according to the present invention involves great advantages. The article as shown consists of a urine container 1, which is manufactured from plastic film webs of for example polyvinyl chloride. It is apparent from FIGS. 1 and 2 that the container as a whole is formed by two outer plastic film webs 2, 3, which form a closed container by being welded to each other along a welding seam 4 which extends along the outer contour of the article and separates the article into a plurality of fields. Two inner material webs 5, 6 cover a part of the surface of the container and are connected to the filling end 18 of the container. Said two plastic film webs 5, 6 are welded together by means of two oblique welding seams 7 and form a check valve 8 by allowing the inlet of liquid through the filling end 18 but by self-closing the two inner plastic film webs 5, 6 to prevent that liquid contained within the container will be discharged by the filling end. The two welding seams 7 do consequently not connect the two outer plastic film layers 2, 3 with each other and is accomplished by means of heating or high frequency energy. At the filling end 18 there is provided a piece of tubing 9 which extends into the container which liquid tight encloses the piece of tubing by means of a tube welding seam 10 enclosing the tubing. A discharge end 11 is positioned at the lower edge 12 of the container and is provided with a discharge tubing 13 which in the same way as the piece of tubing 9 is liquid tight enclosed by the container by means of a welding seam 14. The tubing 13 is in communication with the interior of the container between the two outer plastic film layers 2, 3 and is in its outer end 15 provided with a discharge valve 16 which is movable relative to the tubing 13 and is in a manner known per se adjustable between an open and a closed position. The upper edge of the container is designated with 17 and extends substantially parallel with its lower edge 12 and extends parallel with or forms longitudinal edge portions of the continuous film webs during the manufacturing of the container which is apparent from the plane view of an apparatus for the manufacture of the container.

The apparatus for the manufacture of articles from film webs is shown in FIGS. 3 and 4 schematically and only in part. The apparatus is provided with a plurality of driving and linking rollers 20, 21, 22 for the four plastic film webs, namely the two inner film webs 5, 6 and the two outer film webs 2, 3. The two inner film webs have, which is apparent from FIG. 4, a considerably smaller width than the two outer film webs and are positioned along one side of the apparatus, so that one longitudinal edge portion 23 of all film webs coincide substantially. In the drawings is shown only that part of the apparatus where the treatment of the film webs to a final article takes place by means of welding. In this connection there are shown three welding stations for welding operations in three steps. The first welding station 24 is arranged for welding together the two inner film webs 5, 6 for the formation of the check valve 8 of the container. A second welding station 25 is arranged for welding pieces of tubings 9 for filling and discharge tubings 13 with discharge valves 16. A third welding station 26 is arranged for a final welding, i.e.

welding together the plastic film sheets 2, 3, 5, 6 along the outer contour of the container and along other predetermined lines, which is indicated in FIG. 4. An apparatus framing 27 supports the parts of the apparatus.

The first welding station 24 is provided with an upper welding tool part 28 with welding jaws 29. This welding part is arranged to move in a motion against and from the film webs, which extend above a lower tool part 30 of the welding tool. The two welding jaws 29 of the welding part 28 are provided with end surfaces 32 with a configuration which determines the configuration of the welding seams 7 as obtained. The operating part of the welding jaws is indicated schematically in FIG. 4, where the lower welding tool 30 is schematically shown as a table with brackets 33, 34 which support the table. In connection with the utilization of high frequency energy for the welding operations the lower tool part 30 is made of an electrically conducting material, which for example is connected to earth whereas the two welding jaws 29 are arranged as electrodes, to which high frequency energy is fed from a high frequency aggregate which can be in an embodiment known per se. Also the other welding stations are electrically built up in the same manner. Welding station 25 is provided with two welding jaws 35, 36. The welding jaws are included into an upper tool part 31 which is arranged to perform a raising and lowering motion in direction towards and from the film webs. Also in the second welding station 25 there is included a lower tool part 44 which is supported by the framing 27. The first welding jaw 35 is provided to accomplish the tube welding seam 10 for the connection of the piece of tubing 9, which transversely to the longitudinal direction of the apparatus is fed by means of a device stepwise from one side of the apparatus. At the opposite side of the apparatus there is a device for feeding discharge tubings 13 with discharge valve 16, said tubing being welded tightly between the film webs by means of the welding jaw 36 which forms the welding seam 14. The stations for feeding pieces of tubings are, however, not shown for the sake of clarity and can be of a kind known per se.

From FIG. 3 it is apparent that the outer film webs 2, 3 do not pass through the first welding station 24 between the upper and the lower tool part 28, 30 but are joined via the linking rollers 20, 21, 22 after the first welding station and before the second welding station 25 with the two inner film webs 5, 6. The third welding station 26 is provided with a welding jaw 37 with electrodes, the end surfaces 38 of which are schematically indicated in FIG. 4. The electrodes form consequently the operative part of the welding tool which determines the configuration of the welding seams 4 as obtained according to FIG. 1. As schematically shown in FIG. 3 the welding station 26 is provided with an upper tool part 19 which is connected to the corresponding tool part 31 in the second welding station 25. The welding station 26 also includes a lower tool part 39 which is supported by the framing 27.

The apparatus according to the invention also includes a conveyor belt 40, which is formed by an endless closed loop which is driven and linked with respect to its direction by means of driving and linking rollers 41, 42, 43 and further rollers not shown. From FIG. 3 it is apparent that the conveyor belt 40 does not pass at the welding stations 24, 25 between the upper and the lower tool parts 28, 30, 31, 44, but is introduced between the upper and lower tool parts 37, 39 not until at the third welding station 26 in order to support the film webs 2, 3, 5, 6. The welding at the third welding station is also accomplished by means of high frequency energy. The lower tool part 39 which is arranged as a table of an electrically conducting material is suitably connected to earth. The upper tool part 19 with the electrodes 37 is connected to a high frequency aggregate. According to the invention the conveyor belt 40 is made of a material which is substantially indifferent relative to high frequency energy of the character as utilized, that is to say a certain frequency, voltage etc., which enables good adherence of the plastic film material against the conveyor belt. By means of the extension of the conveyor belt between the upper and the lower tool part 37, 39 the welding at the welding station will consequently be accomplished against the conveyor belt 40 with the lower tool part 39 as a dolly. The film webs will during the welding operation be welded together with each other along the welding seams 4 and to be "welded tightly" against the conveyor belt 40. However, this "welding" is not of the same character as the melting together of the film webs with each other, as the material in the conveyor belt 40 will not melt or melt together with the film webs. The melting in the film webs takes place under a pressing action against the conveyor belt 40 in such a way that a well adapted adhesion against the belt is obtained. This adhesion results in a fixation of those articles which continuously are being formed in the film webs, relative to the conveyor belt, which eliminates oblique tensions in the film material and relieves the film material from unnecessary traction forces. At the third welding station 26 and after this station the articles in the film are consequently conveyed by means of their adhesion against the conveyor belt 40 directly by means of the connections 45 and the conveyor belt as formed, that is to say where the film material adheres, namely along the welding seams 4, which have the configuration as shown in FIG. 4 and designated with 38. However, the adherence is not too great so that the articles after finished transport by means of the conveyor belt can be discharged, that is to say released from the conveyor belt, which can take place by means of devices known per se, for example discharge means with suction cups, which take off the welded, cut-off articles over to a pile of articles or the like.

The method according to the invention takes consequently place in the following manner. The material webs 2, 3, 5, 6 are unwound from each storage roller, not shown, and are transported through the apparatus stepwise, that is to say feeding in steps by means of for example a length corresponding to the length of an article in the longitudinal direction of a film web, or a multiple thereof. The feeding takes place between each treatment operation with the upper tool parts 28, 31, 19 positioned at a distance from the film webs, whereas the film webs are kept immovable during the working stroke of the tool parts 28, 31, 19. The different welding operations, the first welding step at the first welding station 24, the second welding step at the second welding station 25 and the third welding step at the third welding station 26, take place with a rapid lowering motion of the upper tool parts 28, 31, 19 with a very short duration of contact against the film webs with the lower tool parts 30, 44, 39 as a support or dolly. This motion can be accomplished by power devices known per se such as hydraulic or pneumatic cylinders. In the first welding operation the two inner foil webs 5, 6 are consequently welded together by means of the welding seams 7, whereas in the second welding operation at the second welding station 25 said pieces of tubings 9 and discharge tubings with discharge valve 16 are welded tightly between the film webs, whereas at the third welding station 26 a final welding is accomplished with a welding together of the film webs along the welding seams 4. In the last welding operation welding against the conveyor belt 4 takes consequently place and an adherence of the articles to the belt takes place along the configuration designated with 38, that is to say along the welding seams 4. High frequency energy will in that connection pass from the electrodes of the welding jaw 37 through the film webs 2, 3, 5, 6 during the contact of the electrodes against the webs and through the conveyor belt 40 over to the lower tool part 39. This is consequently of great advantage in that the articles in this way are fixed to the conveyor belt and that they are conveyed together with the belt by means of a conveying force which is transferred directly in the connections 45. The fixation of the film webs will be especially advantageous in the case as shown, where some of the connections 45 extend along the longitudinal edges of the film webs and also across the width of the webs. Each article passing the last welding station shows consequently a fixation for the film webs so that they are kept in a correct position and this is of a great advantage especially for each succeeding welding operation at the third welding station and hereby oblique tensions with a risk of folding is avoided. Especially the mounted pieces of tubings 9 and discharge tubings 13 will otherwise place the film webs under stress and result otherwise easily in an oblique tension, which consequently is avoided by means of the apparatus according to the invention. After finished transportation along the conveyor belt 40 the finished articles are released by means of a take-off device which may be of a kind known per se.

The choice of material in the conveyor belt 40 depends on the material in the film webs. The webs can for example be made of a pure polyvinyl chloride or a plasticized polyvinyl chloride. In the latter case it appears to be of advantage to have a conveyor belt 40 made of paper, coated with a layer of varnish of polyester. In this and other cases it appears also to be advantageous to have a belt, completely made of polyester.

The invention is not limited to the embodiment shown in the drawings and described above, but can be modified within the scope of the accompanying claims. For example other articles of similar type can be made by means of the method and apparatus according to the present invention. It is not necessary to use several film webs, but in certain cases the articles can be in one layer and be provided with labels and the like which are welded to the one layer film. It is further imaginable that the film webs have another extension than the extension as shown. Likewise the conveyor belt 40 can extend in another way, for example the conveyor belt need not pass below the first and the second welding station 24, 25 but can for example form a shorter loop. The conveyor belt 40 can also be made of another material which has corresponding adhesion properties. The word adhesion shall be understood in a wide sense and cover physically similar ways of connections giving substantially the same function and result.

I claim:

1. A method of manufacturing an article from at least one continuous film web comprising: welding said at least one film web during transportation through at least one operating station in an apparatus, said welding including welding at least two film layers against each other along at least one welding seam at a predetermined location, said at least one film web being during at least a portion of said transportation supported by a movable conveyor belt, said welding at said welding seam also welding said at least one film web against the conveyor belt so that the film web adheres to and is releasably connected to the belt and is conveyed via a connection formed at the same location as said at least one welding seam, and after transportation releasing said web from the conveyor belt.

2. A method according to claim 1, wherein welding is accomplished in several steps during stepwise transportation of the at least one film web and wherein welding against the conveyor belt is accomplished at the last of said welding steps.

3. A method according to claim 2, wherein preceding welding steps include welding of details to the film web, such as tubings, valves and the like.

4. A method according to claim 1, including a first welding step comprising welding together two inner plastic film webs, a second welding step comprising welding a filling tubing and a discharge tubing to the webs, said first and second welding steps being accomplished without welding against the conveyor belt, and a third welding step comprising welding together two outer plastic film webs with said inner plastic film webs positioned between said outer webs, said third welding being accomplished by means of high frequency energy against the conveyor belt for said connection to the belt for said transportation.

5. An apparatus for manufacturing an article from at least one continuous film web, comprising: at least one welding station, and a conveyor belt for transporting said at least one film web through said station for welding at least two film layers against each other so as to connect said layers along at least one welding seam at a predetermined location, said web being during at least a part of said transportation supported by said movable conveyor belt, said conveyor belt extending through said at least one welding station over a welding dolly for formation of at least said one welding seam by welding the film web against the conveyor belt so that the film web adheres to and is releasably connected to the belt and conveyed via a connection at the same location as said at least one welding seam to a releasing station, at which the article is released from the conveyor belt.

6. An apparatus according to claim 5, wherein the plastic film web comprises a material which is meltable by means of high frequency energy, and wherein the conveyor belt is made of a material, which is substantially indifferent to said high frequency energy and gives a good adherence for the plastic film material upon welding of the film material against the conveyor belt and enables said releasing operation after transportation.

7. An apparatus according to claim 5, wherein said film web material is polyvinyl chloride and said belt material is polyester.

8. An apparatus according to claim 7, wherein the conveyor belt is made completely of polyester.

9. An apparatus according to claim 7, wherein the conveyor belt is made of paper, coated by a varnish layer of polyester.

10. An apparatus according to claim 5, wherein the conveyor belt is endless.

* * * * *